(12) United States Patent
Heinonen (10) Patent No.: US 9,551,990 B2
(45) Date of Patent: Jan. 24, 2017

(54) UNMANNED AERIAL VEHICLE LANDING SYSTEM

(71) Applicant: Sharper Shape Oy, Espoo (FI)

(72) Inventor: Tero Heinonen, Järvenpää (FI)

(73) Assignee: Sharper Shape Oy, Espoo (FI)

( * ) Notice: Subject to any disclaimer, the term of this patent is extended or adjusted under 35 U.S.C. 154(b) by 132 days.

(21) Appl. No.: 14/660,145

(22) Filed: Mar. 17, 2015

(65) Prior Publication Data

US 2016/0274577 A1     Sep. 22, 2016

Related U.S. Application Data (60) Provisional application No. 61/972,519, filed on Mar. 31, 2014.

(51) Int. Cl.
| | |
|---|---|
| *G05D 1/00* | (2006.01) |
| *B64D 1/08* | (2006.01) |
| *B64C 39/02* | (2006.01) |
| *B64D 17/80* | (2006.01) |
| *G05D 1/10* | (2006.01) |
| *G08G 5/00* | (2006.01) |

(52) U.S. Cl.
CPC ........... *G05D 1/0011* (2013.01); *B64C 39/024* (2013.01); *B64D 1/08* (2013.01); *B64D 17/80* (2013.01); *G05D 1/101* (2013.01); *G05D 1/105* (2013.01); *G08G 5/0056* (2013.01); *B64C 2201/128* (2013.01)

(58) Field of Classification Search
CPC ...... G05D 1/0011; G05D 1/101; G05D 1/105; B64C 39/024; B64C 2201/128; B64D 1/08; B64D 17/80; G08G 5/0056
USPC ............................................................ 701/2
See application file for complete search history.

(56) References Cited

U.S. PATENT DOCUMENTS

| | | | |
|---|---|---|---|
| 2016/0196756 A1* | 7/2016 | Prakash ................ | B64C 39/024 701/3 |
| 2016/0229533 A1* | 8/2016 | van Cruyningen ... | B64C 31/024 |
| 2016/0231137 A1* | 8/2016 | Krogh .................. | G01C 23/005 |
| 2016/0232792 A1* | 8/2016 | van Cruyningen .... | G08G 5/003 |
| 2016/0232795 A1* | 8/2016 | Thiele .................. | G05D 1/0022 |

\* cited by examiner

*Primary Examiner* — McDieunel Marc
*Assistant Examiner* — James E Stroud
(74) *Attorney, Agent, or Firm* — Ziegler IP Law Group, LLC (57) ABSTRACT

The present disclosure provides an unmanned flying vehicle (UAV) operable in a plurality of operating modes including a normal operations mode, a safe landing mode and an emergency landing mode. The normal operations mode is initiated when no errors are detected in the system. The safe landing mode is initiated when one or more non-critical components of the UAV are in non-responsive mode or do not work as desired. The emergency landing mode is initiated when one or more critical components are in non-responsive mode or do not work as desired. Further, the safe landing mode overrides the normal operations mode and the emergency landing mode overrides both the normal operations mode and the safe landing mode.

7 Claims, 5 Drawing Sheets

UNMANNED AERIAL VEHICLE LANDING SYSTEM

CROSS-REFERENCE TO RELATED APPLICATIONS

This application claims priority to, and the benefit of, U.S. Provisional Patent Application No. 61/972,519, the disclosure of which is incorporated herein by reference in its entirety.

TECHNICAL FIELD

The present disclosure relates to unmanned flying devices and, in particular, to controlling of unmanned flying devices.

BACKGROUND

An unmanned flying device is an aircraft without an on-board human pilot. Unmanned flying devices are known and identified by different names or titles including Unmanned Aerial Vehicles (hereinafter UAVs), Remotely Piloted Aircraft Systems (RPAS), drones, Remotely Piloted Vehicles (RPVs) and the like. These UAVs may be classified and categorized in terms of range or altitude, shapes, sizes, roles and the like. In terms of different military roles, UAVs can be used in areas including electronic attack (EA), strike missions, suppression and/or destruction of enemy air defense (SEAD/DEAD), network node or communications relay, combat search and rescue (CSAR), and the like. In addition, there a multiple civilian purposes and roles for UAVs such as survey, inspection, search and rescue, security, and surveillance. Moreover, the UAV has different components to perform the above mentioned goals.

Typically, the UAV has components which include an airframe, a propulsion system, a flight control computer or system, a navigation system, a sensor system, actuators, wings, engines, lights, sensors, radio interfaces, optical sensors, audio sensors and the like. The complete system having one or more UAVs and a ground control station, data links, displays, controls, remote human operators and the like, can be referred to as the Unmanned Aerial System (hereinafter UAS). Moreover, the UAV can be controlled either autonomously, based on pre-programmed route and/or mission data, or by the remote operator present on the ground control station.

The ground control station controls and communicates with one or more UAVs using data links. Moreover, one or more UAVs communicate with each other through the data links. Further, the data links between one or more UAVs and the ground control station are based on wireless links, satellite links, radio links and the like.

Traditionally, UAVs were simply used as a remotely operated aircrafts, without having proper autonomous control over the flight of the unmanned flying device. However, with the advancement in technology, these UAVs utilize autonomous control to control the flight. Moreover, depending upon situations, these UAVs can operate in different modes including normal flying mode, safe landing mode, emergency landing mode and the like. The normal flying mode and the safe landing mode are normal and convenient; however, the problem lies in the emergency landing mode. The emergency landing mode corresponds to landing in error situations when one or more functionalities of the UAV partially or completely break down or interrupt. In such situations, landing becomes difficult and risky. Thus, proper control is needed to minimize the damage caused.

In an example, an error such as loss of sensor logic or non-functioning of radio communication to ground control station may occur. In such situations, the UAV may crash on the ground, hit an object in the air or land on some undesired location such as military UAV landing on the land of hostile forces. The uncontrolled landing may pose serious danger to other aircrafts, to birds and to the persons on the ground. The damage caused by uncontrolled landing can be extreme due to considerable weight of the UAV in tens, hundreds or thousands of kilograms. When such an UAV drops on a street with people and cars, accident or even death might occur. Moreover, when such an UAV collides with a passenger airplane in air, the impact may destroy the whole aircraft causing hundreds of human casualties. Further, the UAV itself may be damaged or destroyed due to uncontrolled landing, leading to financial loss.

Traditionally, parachutes control the landing of the UAV in fatal or erroneous situations. However, parachutes are not adequate as they may result in uncontrolled landing to an arbitrary place. The landing may occur in areas with people, driving cars or some nuclear facility. Moreover, the UAV may collide in air with other aircraft. In any of the stated situations, the impact may cause death, accident or even a major disaster. Further, the recovery of the UAV may be difficult or impossible due to the arbitrary location of the emergency landing, leading to a loss of equipment and/or loss of data and/or enabling hostile ground units to recover the UAV for reverse-engineering and analysis.

In view of the aforementioned problems discussed above, there is a need for a method for controlling the emergency landing with high precision to minimize or avoid disaster. Moreover, the method should appropriately select the mode of operation of the UAV based on predictable results of operating with such errors in the UAV.

SUMMARY

The present disclosure provides an unmanned aerial vehicle configured to operate in a plurality of operating modes, said unmanned aerial vehicle comprising a sensor system, and a flight control system comprising a diagnostic module communicatively coupled with the sensor system, which diagnostic module is configured to initiate an operation mode of the unmanned aerial vehicle, which operation mode is selected from the group consisting of
  a first mode, wherein said first mode is a normal operation mode configured to be used when no errors are detected;
  a second mode, wherein said second mode is a safe landing mode configured to be initiated when one or more non-critical components of the unmanned aerial vehicle are in a non-responsive mode or not working according to pre-defined conditions; and
  a third mode, wherein said third mode is an emergency landing mode configured to be initiated when one or more critical components of the unmanned aerial vehicle are in non-responsive mode or not working according to pre-defined conditions;
wherein said second mode is configured to override said first mode and said third mode is configured to override both said first mode and said second mode.

The present disclosure provides also an unmanned aerial system comprising at least one unmanned aerial vehicle according to this description and a ground control station communicatively coupled with the at least one unmanned aerial vehicle.

The present disclosure provides further a method for operating an unmanned aerial vehicle, comprising
operating said unmanned aerial vehicle in a first mode, wherein said first mode is a normal operations mode, when no errors are detected;
operating said unmanned aerial vehicle in a second mode, wherein said second mode is a safe landing mode, when one or more non-critical components of the unmanned aerial vehicle are in a non-responsive mode or not working according to pre-defined conditions; and
operating said unmanned aerial vehicle in a third mode, wherein said third mode is an emergency landing mode, when one or more critical components of the unmanned aerial vehicle are in non-responsive mode or not working according to pre-defined conditions,
wherein said second mode overrides said first mode and said third mode overrides both said first mode and said second mode.

An unmanned aerial vehicle (hereinafter UAV) of this description is thus operable in a plurality of operating modes including a normal operation mode, a safe landing mode and an emergency landing mode. The normal operation mode is initiated when errors, which may lead to problems, are not detected in the system. The safe landing mode is initiated when one or more non-critical components of the UAV are in non-responsive mode or do not work as desired. The emergency landing mode is initiated when one or more critical components are in non-responsive mode or do not work as desired. Further, the safe landing mode overrides the normal operations mode and the emergency landing mode overrides both the normal operations mode and the safe landing mode. Furthermore, in the safe landing mode, the safe landing procedures are initiated.

DETAILED DESCRIPTION

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

The present disclosure provides an unmanned aerial vehicle configured to operate in a plurality of operating modes, said unmanned aerial vehicle comprising a sensor system, and a flight control system comprising a diagnostic module communicatively coupled with the sensor system, which diagnostic module is configured to initiate an operation mode of the unmanned aerial vehicle, which operation mode is selected from the group consisting of a first mode, wherein said first mode is a normal operation mode configured to be used when no errors are detected;
a second mode, wherein said second mode is a safe landing mode configured to be initiated when one or more non-critical components of the unmanned aerial vehicle are in a non-responsive mode or not working according to pre-defined conditions; and
a third mode, wherein said third mode is an emergency landing mode configured to be initiated when one or more critical components of the unmanned aerial vehicle are in non-responsive mode or not working according to pre-defined conditions;
wherein said second mode is configured to override said first mode and said third mode is configured to override both said first mode and said second mode.

According to an embodiment, the third mode is configured to deploy at least one of a parachute, an airbag and a self-destruct mode. According to another embodiment, a ground control station is configured to control said unmanned aerial vehicle by remotely communicating signals to said unmanned aerial vehicle.

The present disclosure also relates to an unmanned aerial system comprising at least one unmanned aerial vehicle as described and a ground control station communicatively coupled with the at least one unmanned aerial vehicle.

The present invention yet further relates to a method for operating an unmanned aerial vehicle, comprising
operating said unmanned aerial vehicle in a first mode, wherein said first mode is a normal operations mode, when no errors are detected;
operating said unmanned aerial vehicle in a second mode, wherein said second mode is a safe landing mode, when one or more non-critical components of the unmanned aerial vehicle are in a non-responsive mode or not working according to pre-defined conditions; and
operating said unmanned aerial vehicle in a third mode, wherein said third mode is an emergency landing mode, when one or more critical components of the unmanned aerial vehicle are in non-responsive mode or not working according to pre-defined conditions,
wherein said second mode overrides said first mode and said third mode overrides both said first mode and said second mode.

According to an embodiment, said safe landing procedure comprises scanning an environment of the unmanned aerial vehicle with at least one sensor; ranking possible landing sites; selecting a landing site; and landing. According to another embodiment, said scanning an environment of the unmanned aerial vehicle further comprises using information from at least one of a map and a memory.

Figure 1:
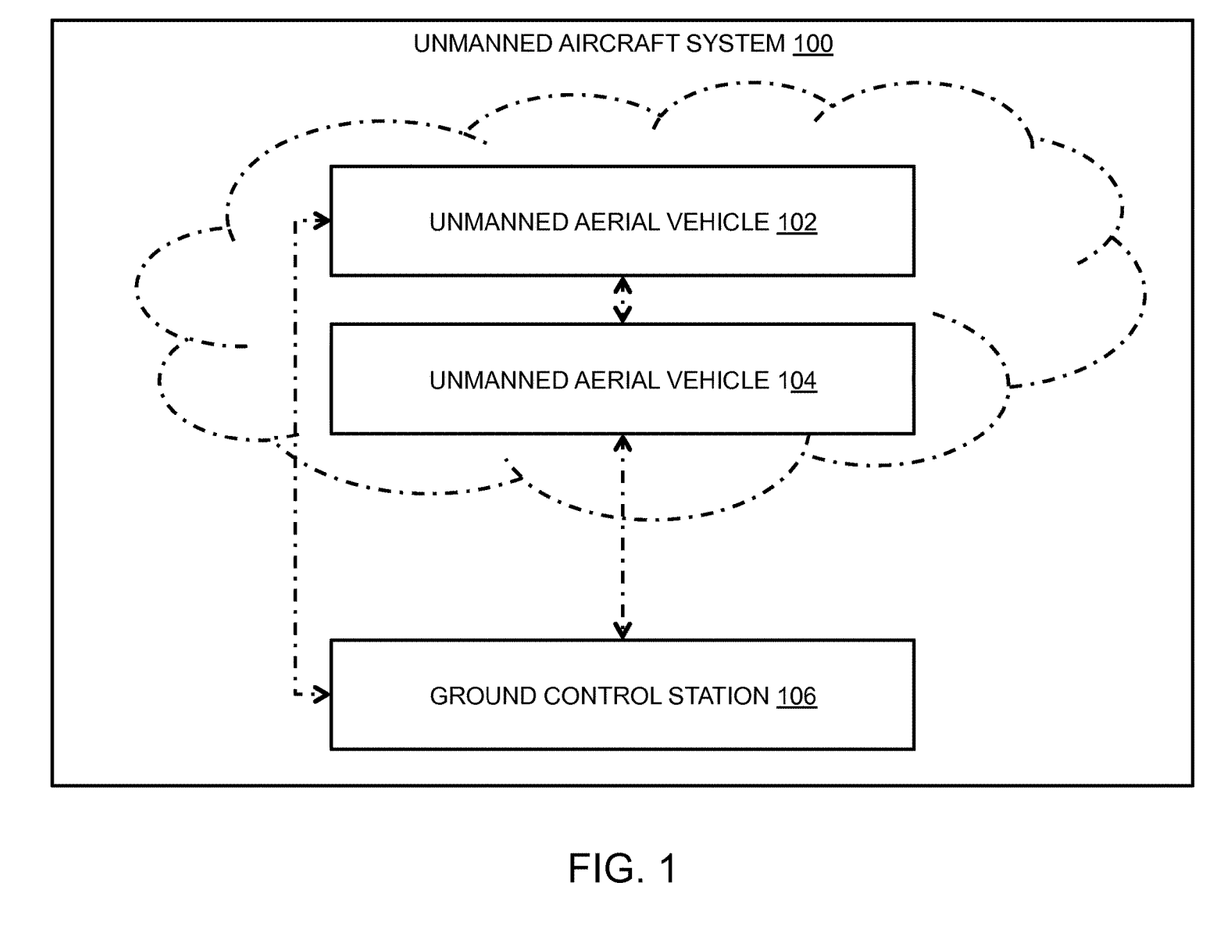
FIG. 1 illustrates an unmanned aircraft system, in accordance with various embodiments of the present disclosure.

FIG. 1 illustrates an unmanned aircraft system (hereinafter UAS) 100, in accordance with various embodiments of the present disclosure. The UAS 100 includes an unmanned aerial vehicle (hereinafter UAV) 102, an UAV 104 and a ground control station 106. The UAV 102 and the UAV 104 are flying vehicles which fly over a geographical area and perform a specific mission such as collect data related to the geographical area. Examples of the UAV 102 and the UAV 104 include but may not be limited to drones, helicopters, airplanes, and balloons. In an embodiment of the present disclosure, instructions related to the routes and other parameters associated with the UAV 102 and the UAV 104 are controlled by remote operators present on the ground control station 106. In another embodiment of the present disclosure, a respective on-board computing system having pre-programmed instructions (such as route information or other mission data) controls the UAV 102 and the UAV 104. In addition, the UAV 102 might communicate with the UAV 104 and exchanges important data. Further, the ground control station 106 controls the UAV 102 and the UAV 104 to direct various modes of operation (explained later in the disclosure) of each of the UAV 102 and the UAV 104 in different situations. The situation can be related to geographical conditions at any point of time and the like.

Figure 2:
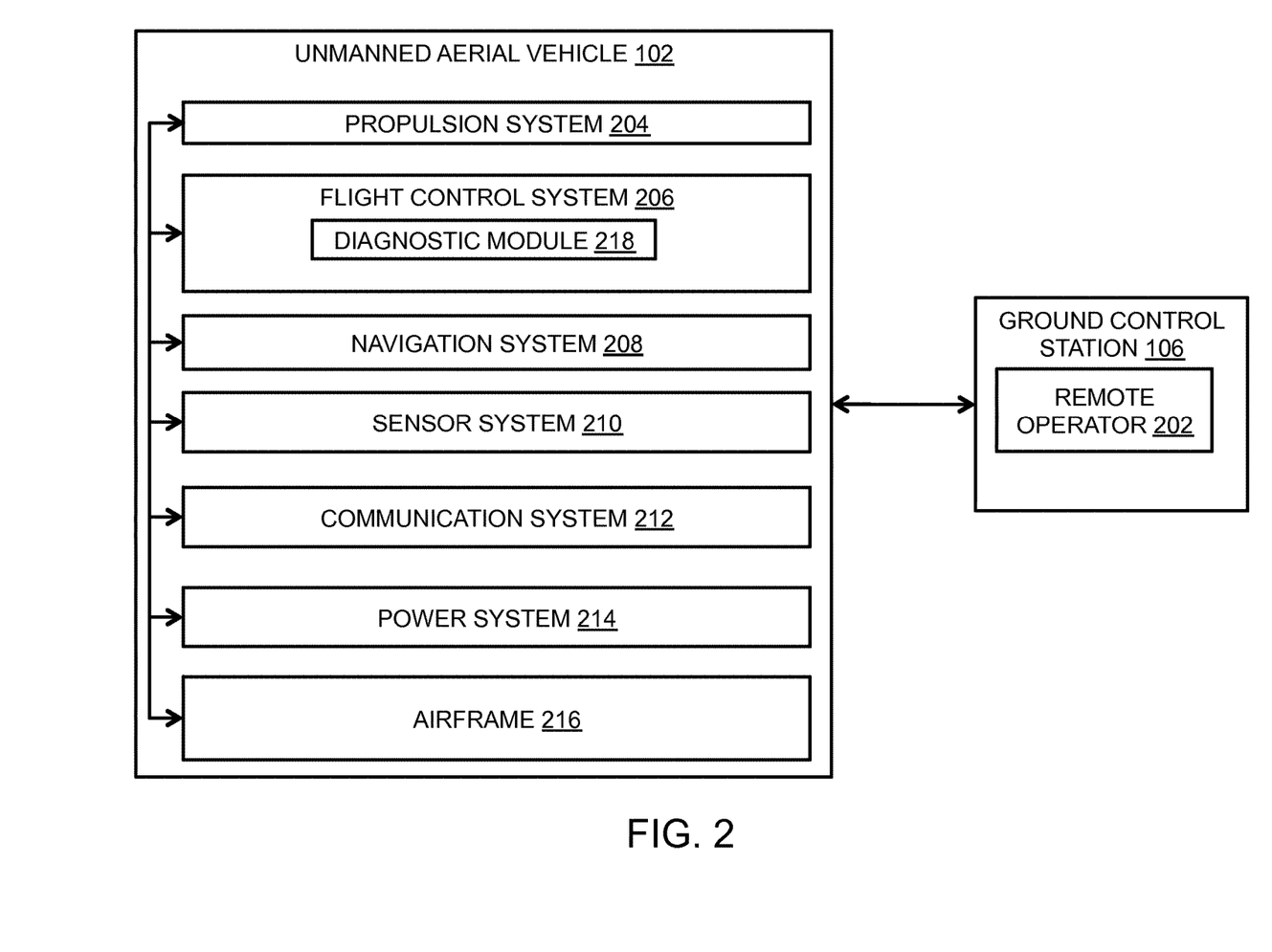
FIG. 2 and FIG. 3 illustrate interaction between various components of an unmanned aerial vehicle and a ground control station in the unmanned aircraft system, in accordance with various embodiments of the present disclosure.

Now referring to FIG. 2, a remote operator 202 present on the ground control station 106 sends the instructions to control the UAV 102. As shown, the UAV 102 includes a propulsion system 204, a flight control system 206, a navigation system 208, a sensor system 210, a communication system 212, a power system 214 and an airframe 216. The propulsion system 204 includes an engine and a means to propel the engine to assist in acceleration of the UAV 102. The flight control system 206 enables controlling the operation mode of the UAV 102. The navigation system 208 provides location data and controls the heading direction of the UAV 102. The sensor system 210 collects various types of data including environmental conditions and the like. The communication system 212 communicates with the UAV 104 and the ground control station 106. The power system 214 supplies power to operate the various components of the UAV 102. The airframe 216 refers to the physical structure including wings, actuators and the like.

As mentioned above, the ground control station 106 controls the flight of the UAV 102 by remotely communicating signals to the UAV 102. The communication takes place between the UAV 102 and the ground control station 106 through wireless links, satellite links, radio links and the like. Moreover, the data link between the ground control station 106 and the UAV 102 is based on direct/indirect radio link or satellite link. Further, the data link may be provided between the UAV 102 and the UAV 104 to enable inter-UAV communication.

The sensor system 210 in the UAV 102 provides different types of payloads to the UAV 102 including payloads obtained from electro-optical sensing systems/scanners, infra-red systems, radars, LiDAR (light detection and ranging), dispensable loads, environmental sensors, cargo or weapon systems and the like. The payloads provide various types of data to the UAV 102 to decide the mode of operation of the UAV 102. Moreover, the payloads provide data about the geographical condition of the site for landing the UAV 102. Further, the flight control system 206 of the UAV 102 includes a diagnostic module 218 to decide the operation mode (or mode of operation) to operate the UAV 102.

Figure 3:
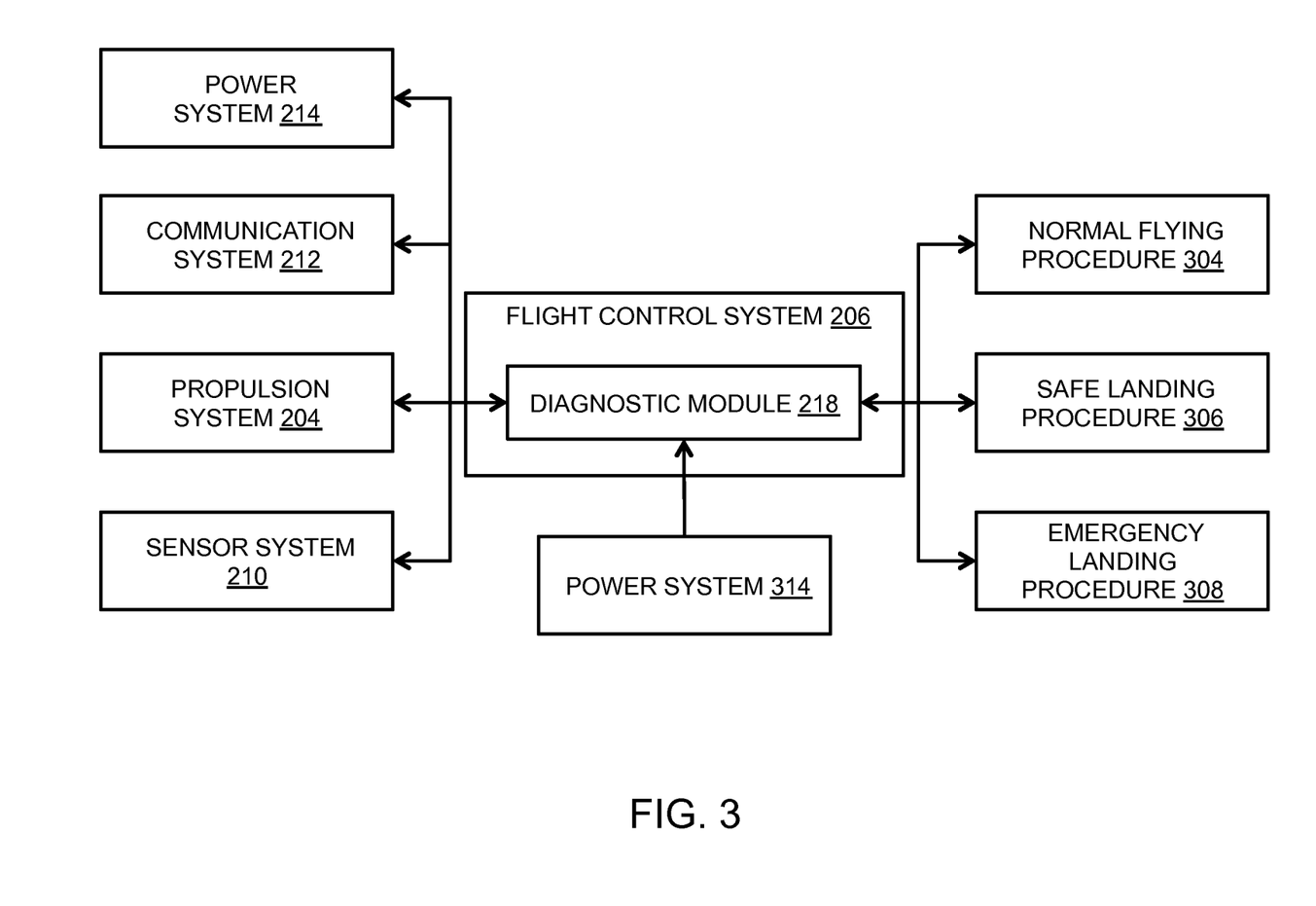

The diagnostic module 218 is powered preferably through an independent power system 314 (the diagnostic module 218 can be powered alternatively or additionally by the power system 214). The diagnostic module 218 collects data from the communication system 212, the propulsion system 204, the power system 214 (such as power failure signal/loss of power indication/low voltage indicator) and the sensor system 210 of the UAV 102 and analyzes the collected data. The communication system 212 provides periodic signals to refresh time in the diagnostic module 218. Accordingly, the propulsion system 204 provides the status of the engine and fuel (or battery or fuel cell in case of an electric UAV) in the propulsion system 204. Further, the sensor system 210 provides operational status of devices including video camera, audio devices and the like. Following the collection and analysis of data, the diagnostic module 218 initiates actions corresponding to the different modes of operation of the UAV 102 (explained later in the disclosure). The diagnostic module 218 selects the corresponding mode of operation of the UAV 102 on the basis of the data collected from the different components of the UAV 102.

In an embodiment, the communication or diagnostic signals from modules are arranged in a way to be fault tolerant. Moreover, an error in one system does not influence signals from other systems. Further, in an embodiment, the communication between modules can be arranged using communication standards such as CAN or Ethernet, or generic analogue signalling input/outputs including current, resistance, voltage and the like. Furthermore, in an embodiment, power supplied to the diagnostics module 218 through the independent power system 314 is separated from the mains power 214 of the UAV 102 to ensure uninterrupted powering to the diagnostic module 218. Furthermore, in an embodiment, the independent power system 314 can be doubled or tripled. In an embodiment, the diagnostic module 218 can be doubled or tripled.

FIG. 3 illustrates interaction between the various components of the UAV 102, in accordance with various embodiments of the present disclosure. As explained above, the diagnostic module 218 in the flight control system 206 collects data from the communication system 212, the propulsion system 204, the power system 214 (such as power failure signal/loss of power indication/low voltage indicator) and the sensor system 210. Following the collection of data, the diagnostic module 218 analyzes the collected data and initiates procedures to operate the UAV 102.

In an embodiment of the present disclosure, the UAV 102 is configured to operate in three modes: a first mode with a normal flying procedure 304, a second mode with a safe landing procedure 306 and a third mode with an emergency landing procedure 308. Further, depending on the results of analysis of data, the diagnostic module 218 can initiate one of the modes including the normal flying procedure 304, the safe landing procedure 306 or the emergency landing procedure 308. The diagnostic module 218 initiates the first mode, with the normal flying procedure 304, when no errors are detected. The diagnostic module 218 initiates the second mode, with the safe landing procedure 306, when one or more non-critical components of the UAV 102 are in non-responsive mode or do not work as desired. Further, the diagnostic module 218 initiates the third mode, with the emergency landing procedure 308, when one or more critical components of the UAV 102 are in non-responsive mode or do not work as desired. In the normal flying procedure 304, the UAV 102 flies in the air under normal control over the navigation to direct the UAV 102. The safe landing procedure 306 corresponds to some errors interrupting with the normal operations of the UAV 102. Examples of errors in non-critical components include but may not be limited to loss of video link or remote control links, or the presence of electronic counter-measures, or a failure of one instance of redundant components. Such errors do not prevent the UAV 102 to stay in air but makes the operation unsafe.

In an embodiment of the present disclosure, in the safe landing procedure 306, sensors such as LiDAR (Light detection and ranging) and the like are used to find a flat and open area nearby to land the UAV 102. Generally, the criterion for selecting an open area is to find an area with no moving objects to avoid persons, vehicles and the like. In addition, the diagnostic module 218 is configured to include a list of forbidden landing areas for landing the UAV 102. Further, the emergency landing procedure 308 includes deploying of one of parachutes, airbags, shields (modifying the contraction of the UAV 102), self-destruction (either breaking the UAV 102 into small components or destroy the UAV 102) and the like. However, the second mode and the third mode are operable in erroneous situations. Therefore, the second mode with the safe landing procedure 306 overrides the first mode with the normal flying procedure 304. Accordingly, the third mode with the emergency landing procedure 308 overrides the first mode with the normal flying procedure 304 and the second mode with the safe landing procedure 306.

In an embodiment of the present disclosure, at least one of the diagnostic module 218 and the power system 214 are configured to be protected against electromagnetic pulse (EMP) using for example a faraday cage or the like.

Figure 4:
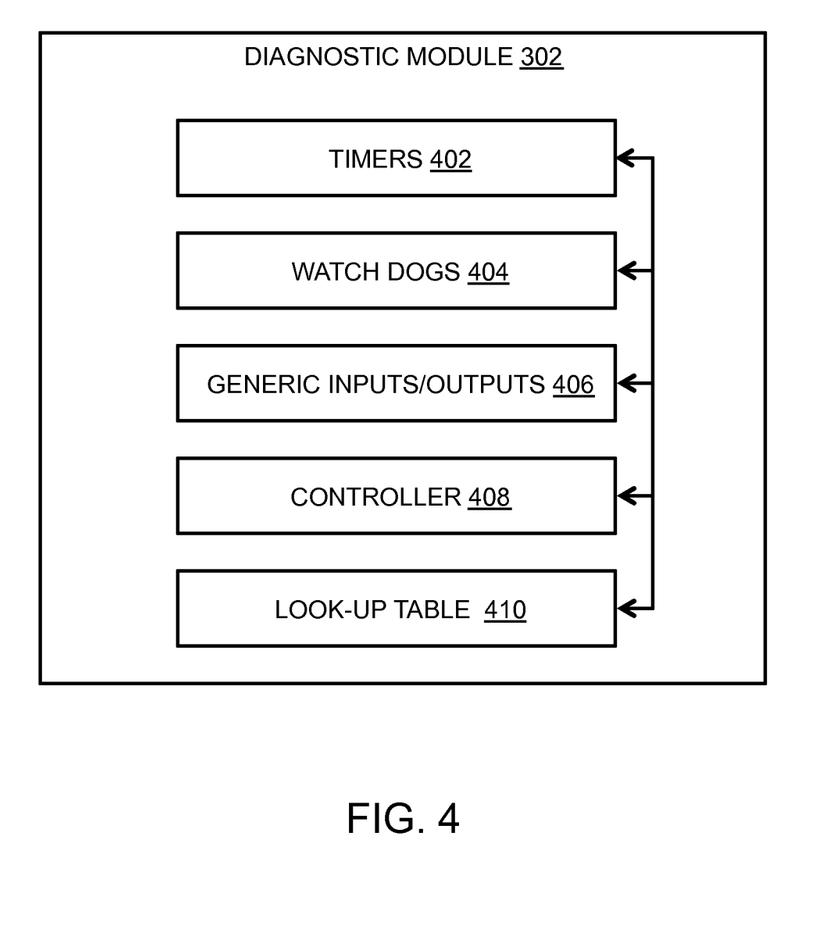
FIG. 4 is a block diagram to illustrate various components of a diagnostic module of the unmanned aerial vehicle, in accordance with various embodiments of the present disclosure.

FIG. 4 is a block diagram to illustrate various components of a diagnostic module 302 (also referred to as the diagnostic module 218 in FIG. 2 and FIG. 3), in accordance with various embodiments of the present disclosure. The diagnostic module 302 includes timers 402, watch dogs 404, generic inputs/outputs 406, a controller 408 and a memory unit 410. The timers 402 measure time between the communications events. The watch dogs 404 analyze whether all the components of the diagnostic module 302 provide signals in a pre-determined pattern. The generic inputs/outputs 406 collect information including battery level of the diagnostic module 302 and power system 214 and the like. The controller 408 programs rules for each type of input situation. Moreover, the controller 408 programs response for every possible error scenarios. Further, the controller 408 forcefully switches the mode of operation of the UAV 102 from the first mode to the second mode or the third mode on the basis of satisfying certain predefined conditions. The look-up table 410 holds the programmed rules and the various inputs received from the other components of the diagnostic module 302.

Figure 5:
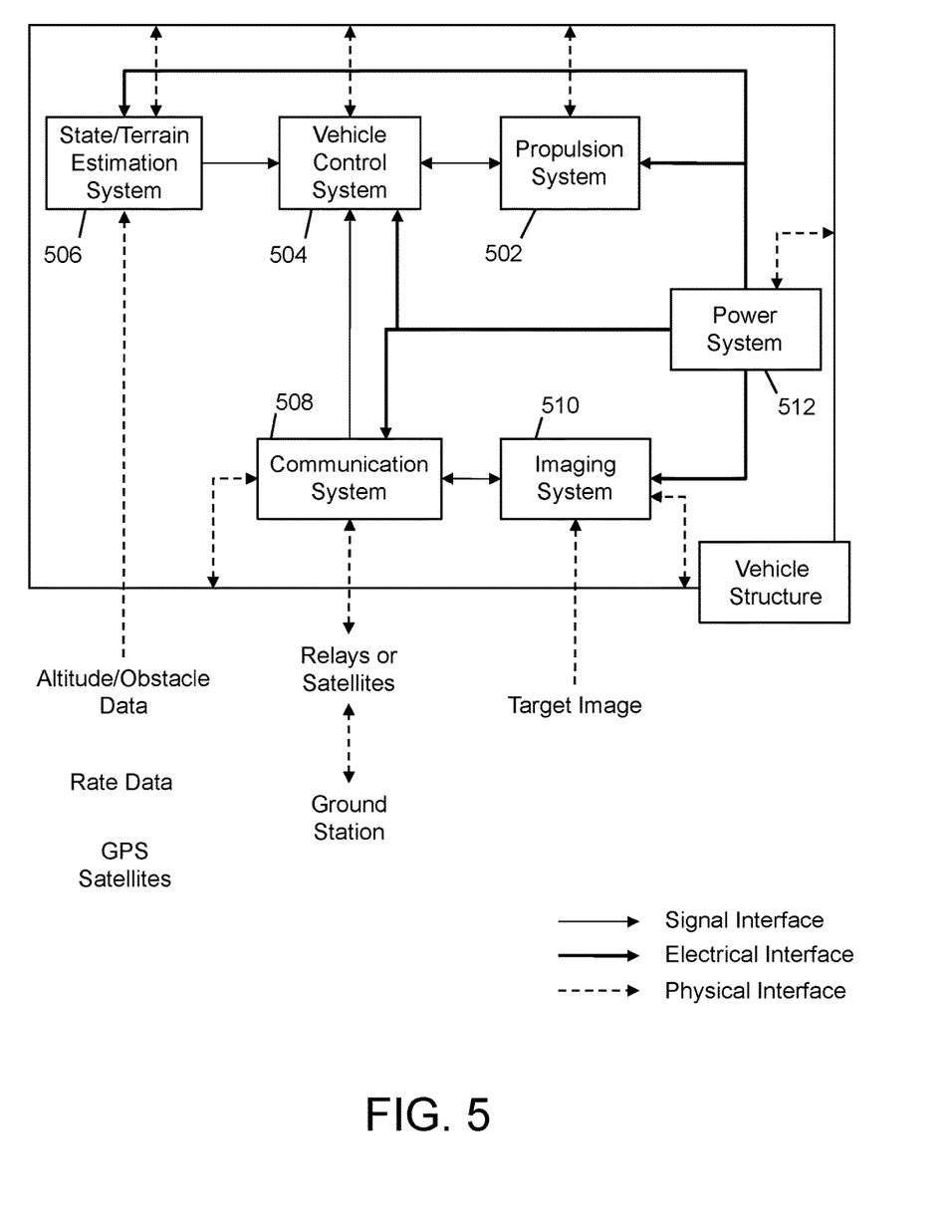
FIG. 5 is a sample schematic block diagram of the unmanned aerial vehicle, in accordance with various embodiments of the present disclosure.

FIG. 5 is a sample interconnection between various functional components of the UAV 102 explained in the present disclosure. As mentioned above, the UAV 102 includes a propulsion system 502 (also referred to as the propulsion system 204 in FIG. 2) to propel the engine to assist in acceleration of the UAV 102, a vehicle control system 504 (also referred to as the flight control system 206 in FIG. 2) to control mode of operation of the UAV 102, a state/terrain estimation system 506 (also referred to as the navigation system 208 in FIG. 2) to provide location data and to control the heading direction of the UAV 102, an imaging system 508 (also referred to as the sensor system 210 in FIG. 2) to collect various types of data including environmental conditions and the like, a communication system 510 (also referred to as the communication system 212 in FIG. 2) to communicate with the UAV 104 and with the ground control station 106, a power system 512 (also referred to as the power system 214 in FIG. 2) to supply power to the UAV 102 and a vehicle structure 514 (also referred to as the airframe 216 in FIG. 2) including the physical structure of the vehicle or the UAV 102.

The method and system explained above has many advantages over the prior art. The method and system controls the landing with high precision to minimize or avoid disaster. Moreover, the method and system appropriately selects the mode of operation of the UAV based on the predictable results of operating with such errors in the UAV. Further, the method and system calculates or predicts the risk associated with the selection of available landing means. Furthermore, the method and system selects the landing option with least risk, given the then available means including propulsion, engine, controls, communication, and sensors, apart from parachutes.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. An unmanned aerial vehicle configured to operate in a plurality of operating modes, said unmanned aerial vehicle comprising
   a sensor system, and
   a flight control system comprising a diagnostic module communicatively coupled with the sensor system, which diagnostic module is configured to initiate an operation mode of the unmanned aerial vehicle, which operation mode is selected from the group consisting of
      a first mode, wherein said first mode is a normal operation mode configured to be used when no errors are detected;
      a second mode, wherein said second mode is a safe landing mode configured to be initiated when one or more non-critical components of the unmanned aerial vehicle are in a non-responsive mode or not working according to pre-defined conditions; and
      a third mode, wherein said third mode is an emergency landing mode configured to be initiated when one or more critical components of the unmanned aerial vehicle are in non-responsive mode or not working according to pre-defined conditions;
   wherein said second mode is configured to override said first mode and said third mode is configured to override both said first mode and said second mode.

2. The unmanned aerial vehicle as claimed in claim 1, wherein said third mode is configured to deploy at least one of a parachute, an airbag and a self-destruct mode.

3. The unmanned aerial vehicle as claimed in claim 1, wherein a ground control station is configured to control said unmanned aerial vehicle by remotely communicating signals to said unmanned aerial vehicle.

4. An unmanned aerial system comprising at least one unmanned aerial vehicle of claim 1 and a ground control station communicatively coupled with the at least one unmanned aerial vehicle.

5. A method for operating an unmanned aerial vehicle, comprising
   operating said unmanned aerial vehicle in a first mode, wherein said first mode is a normal operations mode, when no errors are detected;
   operating said unmanned aerial vehicle in a second mode, wherein said second mode is a safe landing mode, when one or more non-critical components of the unmanned aerial vehicle are in a non-responsive mode or not working according to pre-defined conditions; and
   operating said unmanned aerial vehicle in a third mode, wherein said third mode is an emergency landing mode, when one or more critical components of the unmanned aerial vehicle are in non-responsive mode or not working according to pre-defined conditions,
   wherein said second mode overrides said first mode and said third mode overrides both said first mode and said second mode.

6. The method as claimed in claim 5, wherein said safe landing procedure comprises
   scanning an environment of the unmanned aerial vehicle with at least one sensor;
   ranking possible landing sites;
   selecting a landing site; and
   landing.

7. The method as claimed in claim 6, wherein said scanning an environment of the unmanned aerial vehicle further comprises using information from at least one of a map and a memory.

\* \* \* \* \*